United States Patent [19]

Wunder

[11] E Re. 30,976

[45] Reissued Jun. 22, 1982

[54] HONING MACHINE

[75] Inventor: William G. Wunder, Hamilton, Mich.

[73] Assignee: Ex-Cell-O Corporation, Troy, Mich.

[21] Appl. No.: 144,111

[22] Filed: Apr. 28, 1980

Related U.S. Patent Documents

Reissue of:

[64] Patent No.: 4,136,488
Issued: Jan. 30, 1979
Appl. No.: 828,475
Filed: Aug. 29, 1977

[51] Int. Cl.[3] ..... B24B 5/36
[52] U.S. Cl. ..... 51/58
[58] Field of Search ..... 51/58, 67, 291

[56] References Cited

U.S. PATENT DOCUMENTS

| | | | |
|---|---|---|---|
| 2,252,096 | 8/1941 | Pew | 51/58 |
| 2,551,961 | 5/1951 | Moore | 51/58 |
| 2,908,115 | 10/1959 | Ennis | 51/58 |
| 3,089,289 | 5/1963 | Serafin | 51/58 |
| 3,562,960 | 2/1971 | Thielenhaus | 51/58 |
| 3,959,928 | 6/1976 | Schmitz | 51/58 |

FOREIGN PATENT DOCUMENTS

| | | |
|---|---|---|
| 1752064 | of 1968 | Fed. Rep. of Germany . |
| 126964 | of 1977 | German Democratic Rep. . |
| 377673 | 6/1964 | Switzerland . |

*Primary Examiner*—Harold D. Whitehead
*Attorney, Agent, or Firm*—Frank D. Risko; Edward J. Timmer

[57] ABSTRACT

A honing machine for honing ball bearing races or other arcuate grooved surfaces that extend around the circumference of cylindrical workpieces comprises a workpiece support assembly for rotatably supporting the workpiece in the machine, a spindle drive mechanism for rotating the workpiece, and an oscillation mechanism for holding and oscillating a honing stone in abrading engagement with the arcuate surface of the workpiece as the workpiece is rotated. The oscillation mechanism includes an oscillating tool holder for holding the honing stone and a mounting mechanism for rotatably supporting the oscillating tool holder. The mounting mechanism is tiltable by means of a lift cylinder and toggle linkage to lift the stone out of engagement with the grooved surface of the workpiece for insertion and removal of successive workpieces into and out of the honing machine. The tool holder mounting mechanism is mounted on a horizontal slide mechanism for sliding the oscillating bridge and attached honing stone axially out of the way of the workpiece. Constant downward pressure on the honing stone is provided by a stone feed mechanism. For honing an outer bearing race, a stone feed cylinder is mounted away from the honing stone under the oscillating tool holder and is connected to a finger applying downward pressure on the honing stone by a linkage and torsion shaft arrangement. A radial thrust bearing is employed to hold the workpiece against the spindle drive mechanism. An automatic loading mechanism loads a new workpiece into the machine and ejects a finished workpiece from the machine with a single stroke of a load cylinder.

12 Claims, 9 Drawing Figures

CONTROL PANEL

HONING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to honing machines and more particularly to a bearing honing machine employing a light weight oscillating tool holder and an improved stone disengagement and stone advance mechanism.

2. Description of the Prior Art

In a honing machine for honing the inner and outer arcuate grooved surfaces in ball bearing races or similar surfaces, the races are rotated by means of a spindle drive mechanism in the honing machine, and a honing stone having a mating arcuate surface is pressed against the arcuate surface of the bearing race as it is rotated. In order to provide a smooth and even surface, the honing stone is pivoted or oscillated back and forth while it is in engagement with the bearing surface, with the pivotal motion being generally about the common axis of the arcuate surfaces of the honing stone and bearing race. In order to ensure proper stone pressure against the bearing surface, a stone feed cylinder applies a continuous and predetermined pressure downwardly on the honing stone.

In order to disengage the stone from the workpiece for insertion of a subsequent workpiece into the assembly, it is necessary first to lift the stone out of the groove in the bearing race. If an outer bearing race is being machined, it is necessary also to move the stone axially out of the plane of the bearing race so the bearing race can be removed in a sideways or radial direction from the machine. If an inner bearing race is being machined, it is only necessary to lift the honing stone out of the groove in order to permit radial or sideways removal of the workpiece from the machine.

In honing machines of this nature, the workpiece is rotated by means of a spindle drive assembly and the honing stone is mounted on an oscillation assembly. The oscillation assembly includes an oscillating tool holder or bridge rotatably mounted in a tool holder mounting mechanism. Means are provided for vertical adjustment of the entire oscillation assembly for accommodating workpieces of various sizes. Stone advancement is provided by a pneumatic cylinder mounted on the outer end of the oscillating tool holder adjacent the honing stone. Stone disengagement is provided by a pneumatic cylinder mounted on the outer end of the oscillating tool holder. This cylinder moves the honing stone itself and not the oscillating arm on the mounting assembly in order to engage and disengage the stone from the grooved surface and a bearing race.

One of the significant drawbacks with the foregoing honing apparatus is that the pneumatic cylinders are mounted on the rapidly moving oscillating tool holder itself, and numerous pneumatic hoses must be connected to the cylinders for drive purposes. The addition of the cylinders to the oscillating tool holder substantially increases the mass of the bridge, and the rapid oscillations increase the stress on the hose connections leading to the pneumatic cylinders.

It is one of the objects of the present invention to provide an improved bearing honing machine employing a light weight oscillating tool holder wherein stone feed and tool disengagement cylinders are removed from the end of the oscillating bridge.

Improvement in the workpiece loading and unloading apparatus and the workpiece support mechanism are other objects of the present invention.

SUMMARY OF THE INVENTION

In accordance with the present invention, a honing machine for honing an arcuate grooved surface that extends around the circumference of cylindrical work piece comprises a honing stone having an arcuate honing surface that is shaped to mate with the arcuate surface of the workpiece; a workpiece support mechanism for rotatably supporting the workpiece in the machine; a spindle drive mechanism for rotating the workpiece; and, an oscillation assembly for holding and oscillating the honing stone in abrading engagement with the arcuate surface of the workpiece as the workpiece is rotating. The oscillation assembly includes an oscillating tool holder for holding the honing stone, a tool holder mounting mechanism for pivotably supporting the oscillating tool holder, and an oscillation mechanism for oscillating the tool holder while the honing stone is in abrading engagement with arculate surface of the workpiece. The tool holder mounting mechanism itself is movable by means of a lift mechanism to disengage the honing stone from the groove in the work piece. A control mechanism periodically actuates and deactuates the lift mechanism for loading and unloading workpieces from the machine.

Desirably, the mounting mechanism is tiltable by means of a pneumatic lift cylinder and toggle linkage to raise the honing stone out of the groove in the workpiece.

In the present invention, the tool holder mounting mechanism is mounted on a horizontal slide, so that the honing stone can be moved axially out of the path of the rotating workpiece for removal of the workpiece from the honing machine in a sideways or radial direction.

The honing machine of the present invention incorporates a floating stone that permits self centering of the honing stone in the groove in the workpiece. A pneumatic stone feed cylinder causes an even downward pressure to be maintained on the honing stone as the honing stone becomes worn in the abrading process. In one aspect of the present invention, the feed cylinder is mounted on an inside end of the tool holder, adjacent the point where the tool holder is pivotably mounted to the tool holder mounting mechanism, with a linkage and torsion shaft assembly connecting the stone feed cylinder to a pivotable finger that exerts downward pressure on the honing stone, which is mounted at the opposite end of the oscillating tool holder.

The loading mechanism of the present invention comprises a rack that feeds unfinished bearing races downwardly in a stack to a loading position adjacent the workpiece support in the honing machine. When the honing operation for the piece in the machine is completed, the bearing race in the machine is released, and a transverse pusher blade pushes the bottom bearing race in the stack into the workpiece support mechanism, displacing the finished bearing race from the support mechanism into a discharge rack on the other side of the workpiece support station. The pusher blade then retracts and permits the next succeeding bearing race in the stack to drop down to the loading position. In this manner, a single reciprocation of the pusher blade causes the insertion of a new bearing race into the machine and the ejection of a finished bearing race from the machine.

The bearing races are held against the spindle drive mechanism by a radial thrust bearing that engages the entire periphery of the outer surface of the bearing race.

These and other features and advantages of the present invention will hereinafter appear. For purposes of illustration, but not of limitation, a preferred embodiment of the present invention is described in detail below and shown in the appended drawings.

DETAILED DESCRIPTION OF PREFERRED EMBODIMENTS

Figure 1:
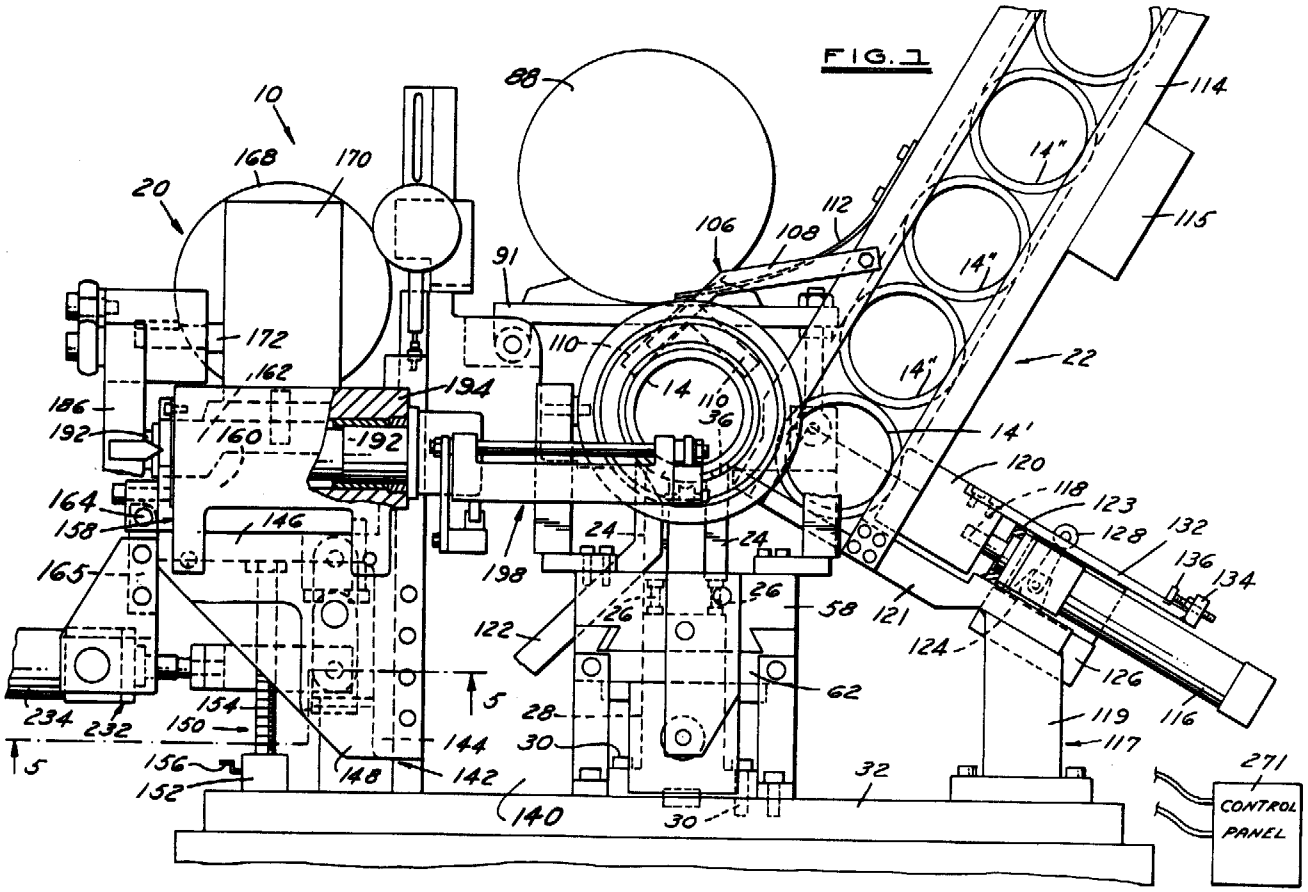
FIG. 1 is a front view of the honing apparatus of the present invention.

Referring now to the drawings, a honing machine 10 constructed in accordance with the present invention includes a workpiece support mechanism 12 for mounting a workpiece 14 in the apparatus, a spindle drive mechanism 16 for rotating the workpiece, a honing stone 18, and an oscillation assembly 20 for holding the stone in engagement with the workpiece while oscillating the stone back and forth in order to ensure a smooth and even finish on the groove in the workpiece. A loading mechanism 22 provides for automatic feeding of successive bearing races into and out of the honing machine.

Figure 2:
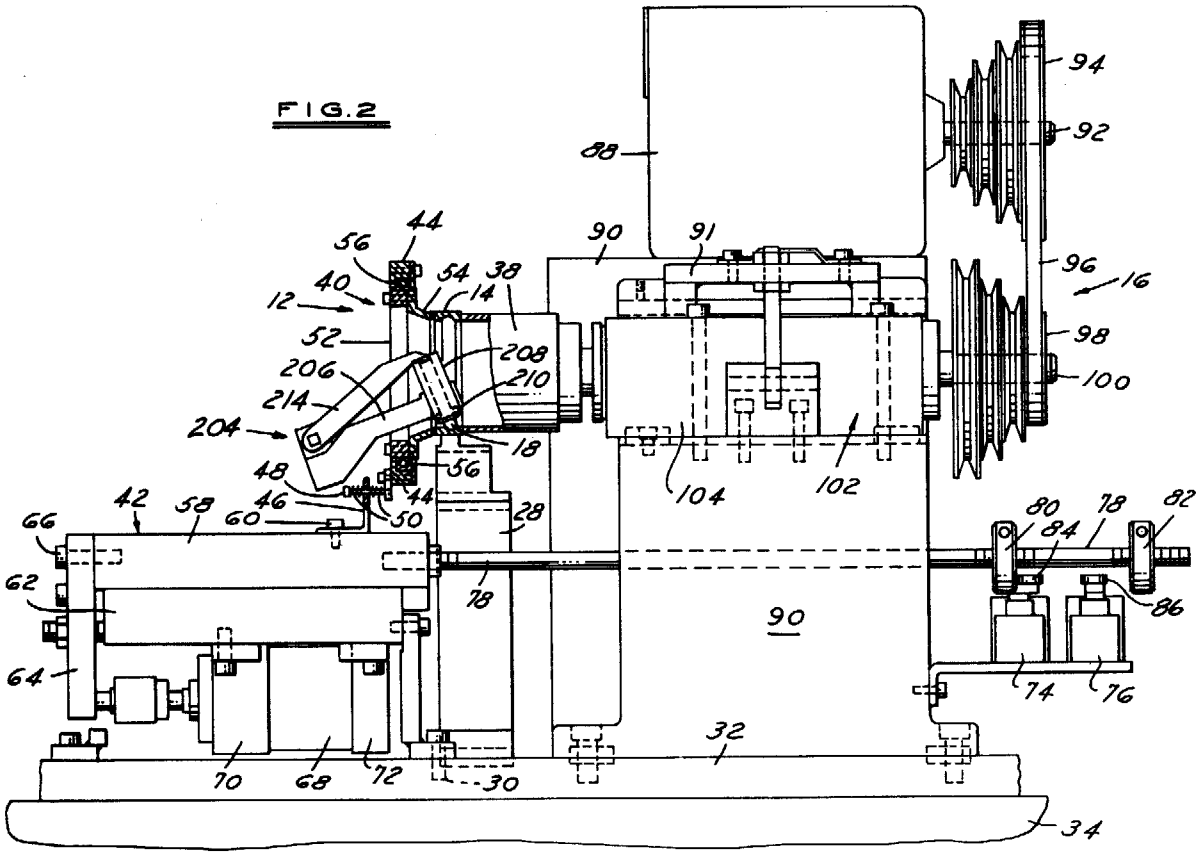
FIG. 2 is a partially sectional side view showing the honing stone in engagement with the inner grooved surface of an outer race of a ball bearing.

Workpiece support mechanism 12, as shown in FIGS. 1 and 2 comprises a V-shaped two piece support block 24 mounted for vertical movement on bolts 26 which are threaded into a base member 28. Bolts 26 provide for vertical height adjustment of the mounting block on the base member. Base member 28 is in turn attached by threaded fasteners 30 to a base plate 32. Base plate 32 is mounted on a work table 34. Workpiece 14 rests on carbide wear pads 17 affixed to the V-shaped sides 36 of support block 24 when it occupies its honing position in the machine. When in the honing position, the axis of the workpiece (an outer bearing race of a ball bearing assembly in the illustrated embodiment) is concentric with respect to a rotating drive spindle 38 of the spindle assembly. Drive spindle 38 is a generally cup-shaped member, the outer edge of which bears against the inner peripheral edge of the workpiece.

Bearing race 14 is held against drive spindle 38 by means of a radial thrust bearing assembly 40, which is mounted on clamping slide assembly 42. Thrust bearing 40 includes a thrust bearing housing 44, which is attached by means of a bracket 46 to the slide assembly 42. Thrust bearing housing 44 is attached to bracket 46 by fastener 48 that fits through the bracket, with springs 50 on each side of the bracket providing a resiliently biased lost motion interconnection between the thrust bearing and mounting plate 42. The inner race 52 of the radial thrust bearing assembly 40 includes an annular pressure plate 54 that engages the outer peripheral surface of bearing race 14 and holds it firmly against drive spindle 38. Bearing 56 of the thrust bearing assembly permits rotation of the inner race with respect to the housing 44.

Clamping slide assembly 42 includes an upper mounting plate 58 on which bracket 46 is mounted by means of a threaded fastener 60, and a stationary lower plate 62, with a grooved interface being provided between the plates.

A depending bracket 64 is attached at an upper end to plate 58 by means of threaded fastener 66. The lower end of the bracket is attached to the output shaft of a clamping cylinder 68 mounted on the under side of plate 62 by means of brackets 70 and 72. Upon extension of the output shaft of clamping cylinder 68 plate 58 is moved to the left (FIG. 2 orientation), thus moving thrust bearing assembly 40 out of contact with bearing race 14. In this position, the bearing race can be ejected from the apparatus and replaced with a new unfinished bearing race.

The thrust of clamping cylinder 68 is controlled by means of a pair of limit switches 74 and 76 mounted at the back of the machine. A rod 78 attached at the left hand end (FIG. 2 orientation) to plate 58 extends to the rear of the machine and actuates limit switches 74 and 76 by means of dogs 80 and 82 respectively, which are mounted on threaded portions of the rod. When dog 80 contacts an actuating arm 84 of limit switch 74, the thrust bearing pressure plate 54 is in contact with the outer surface of bearing race 14, clamping the bearing race in place. When the slide is moved to the left, dog 82 actuates arm 86 of limit switch 76 when the thrust bearing assembly 40 is moved away from the workpiece, thus stopping the extension of the clamping cylinder.

The elements of spindle drive assembly 16 are shown in FIGS. 1 and 2. Spindle drive assembly 16 includes drive motor 88 mounted on a mounting plate 91, which is in turn mounted on a base 90. An output shaft 92 has a set of multiple diameter pulleys 94 attached thereto. These multiple diameter pulleys are interconnected by means of a belt 96 to a corresponding set of multiple diameter pulleys 98 mounted on the output shaft 100 of spindle assembly 102. Spindle assembly 102 includes a housing 104 mounted on base 90 and output shaft 100, which extends through the housing and is rotatable with respect thereto. The right hand end (FIG. 2 orientation) of shaft 100 is drivingly interconnected to spindle drive motor 88, while the left hand end of drive shaft 100 is connected to spindle 38, which contact the bearing race 14. Operation of drive motor 88 thus causes the rotation of shaft 100 and the rotation of bearing race 14.

Bearing race 14 is held down in position on carbide wear pads 17 by means of a resiliently biased holding device 106. Holding device 106 includes an arm 108 pivotably attached to the loading rack at the right hand end thereof (FIG. 1 orientation). A downwardly facing V-shaped workpiece holding member 110 is attached to the left hand end of arm 108. A leaf spring 112 attached at one end to the loading rack bears against the workpiece holding member and urges it downwardly against workpiece 14. Arm 103 can be resiliently pivoted upwardly for removal and insertion of workpieces.

Loading mechanism 22 comprises a feed ramp or loading rack 114 for feeding bearing races into the honing machine. In the illustrative embodiment, bearing race 14' is positioned in loading position at the bottom of the stack and bearing races 14'' are stacked on bearing race 14' in the rack. A load cylinder 116 is transversely aligned with the loading rack opposite the bottom of the rack or loading station. The output shaft 118 of the load cylinder is connected to a pusher blade 120 that is adapted to engage and push the bearing race 14' in the loading station into the support position in the honing machine. When a honing operation has been completed and the thrust bearing assembly 40 is released from the finished bearing race 14, load cylinder 116 is actuated and pushes the next succeeding bearing race 14' into the workpiece support mechanism. The movement of bearing race 14' into the workpiece support mechanism causes bearing race 14' to engage and dislodge the finished workpiece from the machine. Finished workpiece 14 moves to the left (FIG. 2 orientation) into unloading ramp 122, which conveys the finished workpiece from the machine. A conventional limit switch 115 (shown schematically in FIG. 1) senses the presence of parts in the loading rack and stops the honing operating when there are only three parts left in the rack.

With the loading apparatus thus constructed, a single actuation of load cylinder 116 removes the finished part from the machine and inserts a new unfinished part in its place. When load cylinder 116 is retracted, the next bearing race drops down into the loading position for a subsequent cycle. This type of loading mechanism substantially improves the loading and unloading speed of the apparatus.

Load cylinder 116 and loading rack 114 are mounted on mounting post 117 extending upwardly from base 32. Mounting post 117 includes an upright member 119 having an inclined upper surface and an inclined member 121 mounted on the upper surface. A mounting bracket 123 having an opening therein extends upwardly at right angles to the inclined member. The front or left hand end (FIG. 1 orientation) of the load cylinder fits through the mounting bracket and is attached thereto by threaded fasteners.

The inward thrust of load cylinder 116 is controlled by means of a limit switch 124, which has an upwardly extending cam following arm 128. Limit switch 124 is mounted on an L-shaped bracket 126 that is attached to mounting post 117. A shaft 132 attached by threaded fasteners to pusher blade 120 extends rearwardly therefrom. A dog 134 attached to the rear end of shaft 132 includes a bolt 136 threaded therein that engages arm 128 of the limit switch. Rotation of bolt 136 provides for adjustment of the inward stroke of the pusher blade before actuating the limit switch. When bolt 136 on dog 134 actuates limit switch 124, the pusher blade is fully extended and bearing race 14' is inserted in the honing machine. The load cylinder then automatically reverses and retracts the pusher blade into its fully retracted position.

Oscillation assembly 20 functions to hold the honing stone in abrading engagement with the workpiece while oscillating the honing stone back and forth in a pivoting motion against the rounded surface of the bearing race. The oscillation mechanism also incorporates apparatus described below for applying a constant downward pressure to the honing stone and for lifting and removing the honing stone from the area of the workpiece so that successive workpieces can be loaded into the honing machine.

Figure 5:
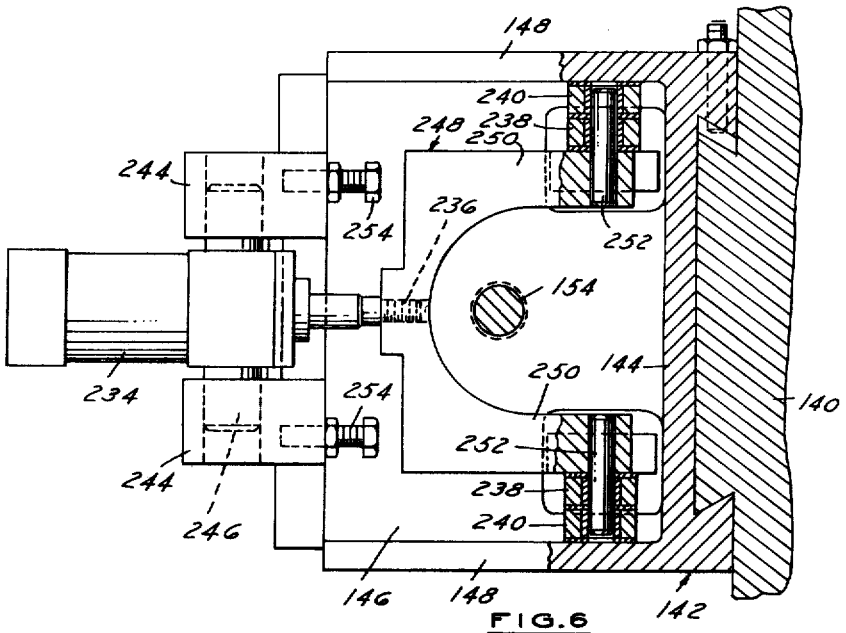
FIG. 5 is a partially sectional view taken along line 5—5 of FIG. 1.

Oscillation assembly 20 includes a vertical base 140 attached at the bottom thereof to base plate 32 in a fixed position relative to the spindle drive assembly. An oscillation assembly support member 142 is slidably attached to vertical base 140 by means of a dovetail slide interconnecting the two elements (see FIG. 5). A vertical section 144 of the oscillating assembly support mechanism includes the female portion of the dovetail slide, and a horizontal mounting plate 146 extends outwardly from the top of vertical member 144. Side plates 148 provide reinforcement for horizontal plate 146.

A worm gear jack 150 extending between base plate 32 and the under side of horizontal plate 146 provides for height adjustment of the oscillating assembly support mechanism. Worm gear jack includes a worm gear 152 attached to base plate 32 and an upwardly extending threaded output shaft 154, which is attached at the upper end to the underside of horizontal plate 146. The worm gear jack is operated by means of a screw actuator 156 incorporated into the worm gear. The worm gear jack is manually operated to raise and lower the oscillation assembly support mechanism for different sizes of bearing races.

An oscillation assembly slide mechanism 158 is pivotably mounted on plate 146 for pivotal movement about an axis parallel to the axis of the spindle drive mechanism. Slide mechanism 158 includes a base 160 and an upper plate 162 with a slide connection being formed between the plates so that upper plate 162 is slidable in an axial direction relative to the axis of the spindle drive mechanism. Lower plate 160 is pivotably mounted on plate 146 by means of a slide pivot shaft 164 that engages [flanges] *block.* 165 at the left hand edge of plate 146.

Figure 4:
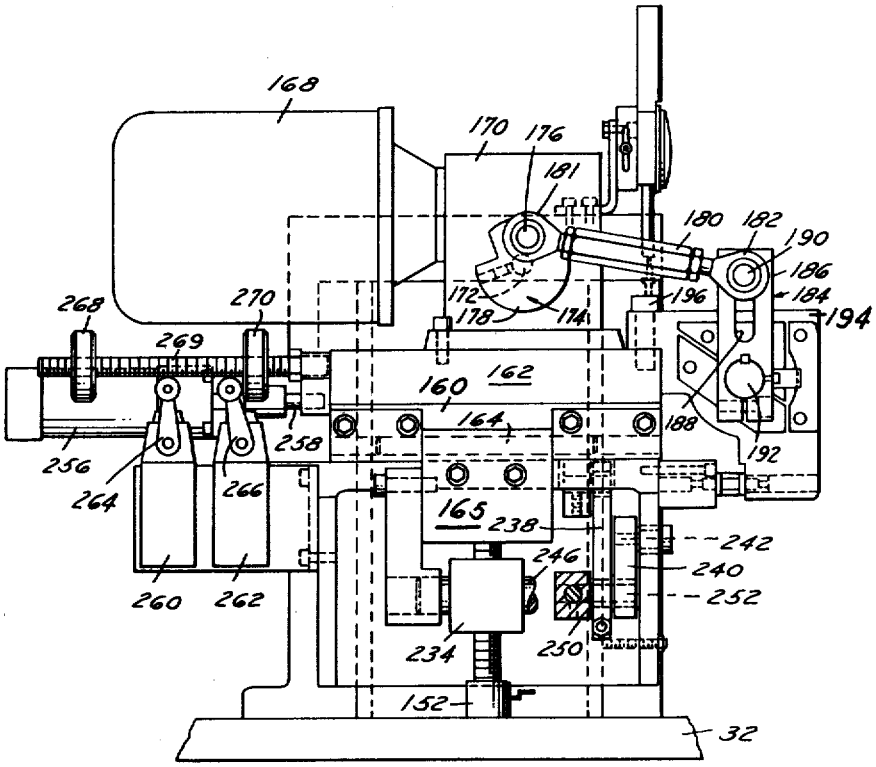
FIG. 4 is a side view of the oscillation assembly of the present invention.

The oscillation assembly includes an oscillation motor 168 mounted on plate 162. An output shaft of motor 168 is connected through a gear reducer 170 to a transverse drive shaft 172. A drive wheel 174 is attached to shaft 172 and includes an eccentric stub shaft 176 and a counter balance weight 178. A connecting rod 180 is journaled at a left hand end (FIG. 4 orientation) to shaft 176 by universal coupling 181, and the right end of connecting rod 180 is coupled by a universal coupling 182 to an adjustable rocker arm 184. Adjustable rocker arm 184 includes an arm 186, having a longitudinal T-shaped channel 188 therein. A fitting 190 rides along the T-shaped channel and includes an output shaft extending through the channel and into engagement with coupling 182. The lower end of arm 186 is attached to a pivot shaft 192 such that rotational movement of arm 186 causes a rotational movement of shaft 192. Fitting 190 includes a threaded fastener for locking the fitting at any desired position along channel 188. Thus, when oscillation motor 168 causes eccentric shaft 176 to rotate, arm 186 oscillates back and forth and causes a similar oscillation in the shaft 192.

The radial oscillation of arm 186 and shaft 192 is adjustable by moving the position of fitting 190 in channel 188. When fitting 190 is at the upper end of channel 188 (a maximum distance away from shaft 192), the radial amount of oscillation is minimized, and the radial movement increases as fitting 190 is moved toward shaft 192.

Shaft 192 is journaled in a mounting block 194 which is attached by a threaded fastener 196 to plate 162.

Figure 6:
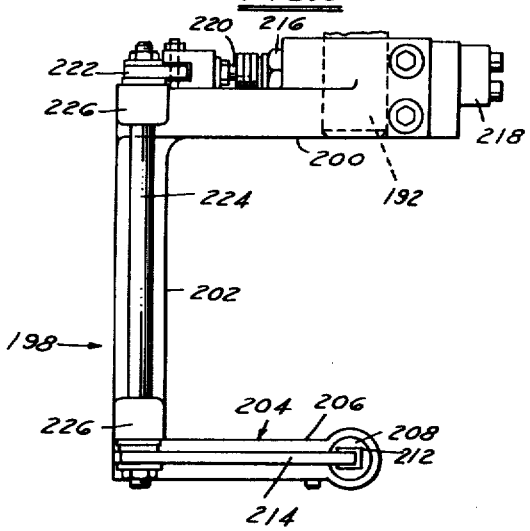
FIG. 6 is a top view of the oscillating tool holder assembly of the present invention.

While the left hand end of shaft 192 is connected to arm 186, the right hand end of shaft 192 (FIG. 1 orientation) extends out of the other side of mounting block 194. An oscillating tool holder 198 is attached to the right hand end of shaft 192. Oscillating tool holder 198 extends from an inner end which is attached to shaft 192 to an outer end which holds the honing stone 18. Oscillating tool holder 198 (FIG. 6) includes an L-shaped member having a first arm 200 mounted on shaft 192 and extending radially therefrom and a second arm 202 extending perpendicularly from the outer end of arm 200. A stone mounting arm 204 is mounted on the outer end of arm 202 and extends perpendicularly inwardly therefrom parallel to arm 200, such that the abrading end of the honing stone is positioned adjacent the oscillation axis of the tool assembly.

Stone mounting arm 204 (as shown in FIG. 2) incorporates a stationary lower arm 206 that is attached to arm 202 by threaded fasteners or the like. A stone mounting block 208 is mounted in an opening in the outer end of arm 206. Mounting block 208 has an axial opening therethrough for carrying the honing stone, with a resilient O-ring 210 surrounding the honing stone for resiliently holding the honing stone at any given position along the mounting block. The lower end of honing stone 18 has a symmetrical arcuate surface that mates with the grooved surface in the bearing face in the manner shown in FIG. 2. The honing stone is positioned by the mounting apparatus such that a common axis of the arcuate bearing race and arcuate honing stone surface at their point of contact coincides with the axis of rotation of the oscillating pivot shaft 192. Thus, when the oscillating tool holder pivots back and forth, the abrading end of the honing tool oscillates through a circular path, providing even wear and even finishing of the bearing race surface.

One of the advantages of the stone holding mechanism of the present invention is that the stone is not rigidly retained in the mounting block, as in most other types of honing machines. While this feature in and of itself is not new in the present invention, it does provide an advantage in that the mounting block permits slight movement of the honing stone so that the honing stone with respect to the groove is the workpiece would be self-aligning in the groove. In other types of honing machines, precise adjustment of a rigidly held stone is required in order to lift the stone accurately into the groove in the workpiece.

Mounting block 208 is provided with a longitudinal slot 212 along one side thereof facing the opposite end of arm 206. A stone feed finger 214 is pivotably mounted at the left hand end of arm 206 (FIG. 2 orientation) and extends to a right hand end in contact with the honing stone. The stone feed finger fits into slot 212 and moves the honing stone downwardly in the mounting block as the finger is pivoted in a clockwise direction.

Figure 7:
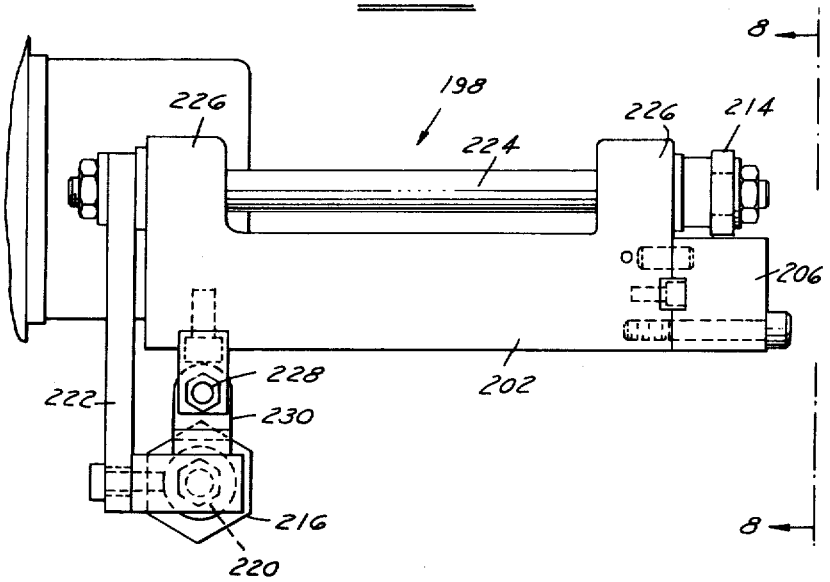
FIG. 7 is a front view of the tool holder assembly.
Figure 8:
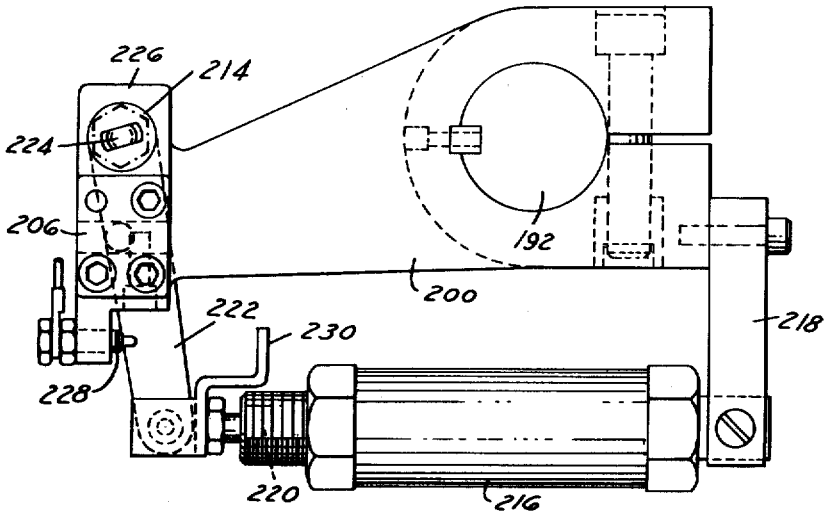
FIG. 8 is a side view of the tool holder assembly.

Stone feed finger 214 comprises a portion of the stone mechanism of the present invention. The remaining elements of the stone feed mechanism are mounted on other arms of the oscillating tool holder assembly. A pneumatic stone feed cylinder 216 (FIGS. 7 and 8) is mounted on the under side of arm 200 by means of a clevis bracket 218 extending downwardly from arm 200. An output shaft 220 is attached to the lower end of a pivotable link 222, which is attached to a transverse pivotable shaft 224 that extends longitudinally along arm 202. Shaft 224 is journaled in bearings 226 at opposite ends of arm 202. The outer end of shaft 224 is connected to stone feed finger 214, such that rotation of shaft 224 causes radial movement of finger 214.

In the embodiment shown, as stone feed cylinder 216 is extended at a predetermined pressure, the stone feed finger 214 presses the honing stone downwardly against the workpiece at a predetermined pressure and continues to press the stone at this pressure against the workpiece as the stone is worn away through abrasion. A stone wear switch 228 (FIG. 8) is positioned at the outer end of the stroke of stone feed cylinder 216, and a contact arm 230 extending upwardly from the output shaft of the stone feed cylinder is adapted to contact and actuate the stone wear contact switch. When the control arm 230 actuates switch 228, this signifies that the honing stone is fully worn and must be replaced, and the honing machine automatically is deactuated for honing stone replacement.

With the stone feed apparatus of the present invention, the oscillating tool holder maintains a light weight construction with an unobstructed view of the workpiece. The stone feed cylinder is mounted in an out-of-the-way position on the under side of arm 200 and immediately adjacent the pivot axis of the oscillating bridge. Thus, the stone feed cylinder is not subjected to large oscillations as the bridge is oscillated. This minimizes failures attributable to rapidly oscillating hose connections. The simple linkage extending between the stone feed cylinder and the honing stone itself provides a simple and effective torsion bar type of stone feed arrangement that is advantageous in comparison to stone feed systems wherein a stone advance cylinder is mounted directly over the honing stone at the outer end of the arm.

As shown in FIG. 2, when the honing stone is in honing position, the stone fits at least partially downwardly into the arcuate grooved surface in the bearing race 14. When the honing operation is completed, it is first necessary to lift the honing stone out of the groove in the bearing race and then move the honing stone axially to the left (FIG. 2 orientation), so that the bearing race can be removed in a sideways or radial direction from the machine.

The honing stone is raised by means of a lift mechanism 232 (FIG. 1) that is adapted to pivot the entire oscillating bridge assembly upwardly about pivot shaft 164.

Figure 3:
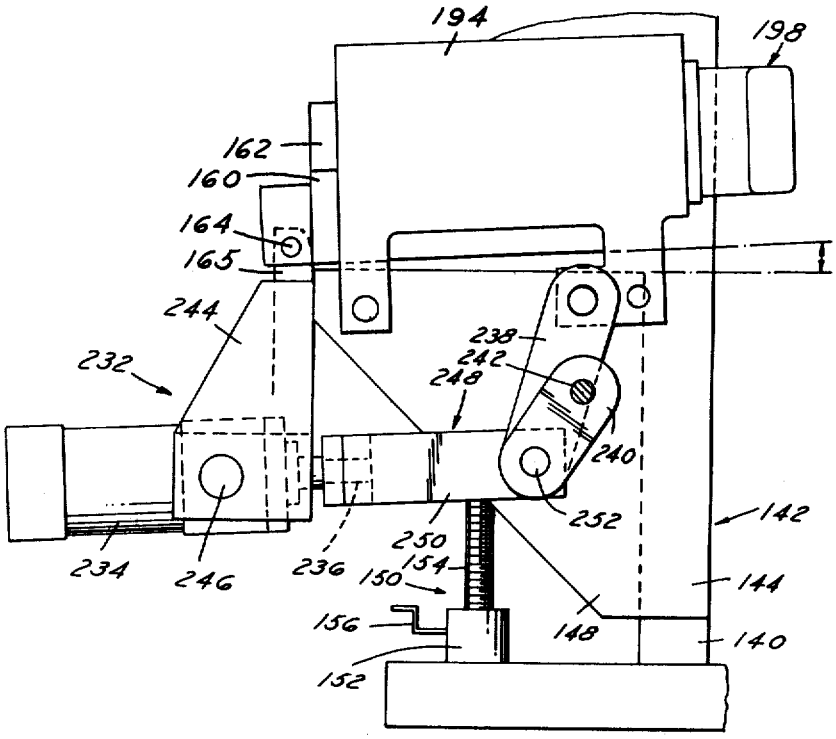
FIG. 3 is a front view showing the oscillation assembly pivoted upwardly to lift the honing stone from the groove in the bearing race for loading and unloading workpieces from the machine.

Lift mechanism 232 (see FIGS. 3, 4, and 5) includes a lift cylinder 234 having an extendible output shaft 236 connected at an outer end to a yoke 248, which is in turn connected to two pairs of toggle links 238 and 240. The separate pairs of toggle links 238 and 240 are pivotably attached to each of two outer legs 250 of the yoke by means of a shaft 252 extending through each leg 250.

To pivot the oscillating assembly upwardly and thus raise the honing stone out of the groove in the workpiece, lift cylinder 234 is actuated to retract shaft 236. When the shaft is retracted, the short toggle 240 causes the outer end of shaft 236 to pivot upwardly about the axis 242 wherein the short toggle shaft is connected to side plate 148. This causes toggle 238 to force the right hand side (FIG. 3 orientation) of plate 160 upwardly a predetermined distance, depending on the stroke of the lift cylinder. Lift cylinder 234 is itself pivotably mounted between a pair of blocks 244 by means of an axle shaft 246 that is journaled in each of the mounting blocks.

The retraction stroke of lift cylinder 234 is limited by means of threaded stops 254, which are threaded into the base and engage yoke 248 after the output shaft of the lift cylinder has been retracted a predetermined distance. Variation in the stroke of lift cylinder 234 can be provided by threading the stops further into or out of the base.

When the lift cylinder has been actuated so that the honing stone is lifted from the groove in the workpiece, the next step in removal of the workpiece from the machine is the movement of the honing stone axially out of the plane of the workpiece so that the workpiece can be moved in a sideways direction from the machine. In order to accomplish this function, an oscillating slide cylinder 256 is mounted in a fixed position at the rear of the machine (at the left hand side of FIG. 4), with an extendible output shaft 258 connected to plate 162 of the oscillation slide mechanism. When the cylinder is actuated to extend shaft 258, plate 162 is moved to the right, moving honing stone 18 away from the workpiece.

Limit switches 260 and 262 are employed to control the stroke of cylinder 256. Cam arms 264 and 266 of limit switches 260 and 262, respectively, are actuated by means of dogs 268 and 270, respectively, which are mounted on a threaded shaft 269 extending rearwardly from movable plate 162. When dog 268 engages cam arm 264, this activates limit switch 260 and signifies that the tool has been completely removed from the workpiece so that the workpiece can be removed from the machine. The slide cylinder is retracted until dog 270 engages cam arm 266 and actuates limit switch 262; this signifies that the honing stone has been fully inserted into the workpiece. When this occurs, the inward stroke of the slide cylinder stops, and the lift cylinder 234 lowers the honing stone into the groove in the workpiece.

While the tiltable platform and toggle linkage assembly described herein is a particularly desirable structure for raising and lowering the tool holder mounting apparatus, other means also could be employed. For example, instead of using a toggle linkage, a vertically oriented lift cylinder employing a direct vertical lift with no toggle linkage could be used. Also, a vertical cylinder could be connected between vertical base 140 and oscillating assembly support mechanism 142 for raising the entire oscillation assembly on the vertical slide. This would eliminate the tiltable platform. In this latter structure the worm gear jack would have to be constructed to permit the mounting platform to be raised off the top of the jack.

To briefly describe the operation of the present apparatus, the cycle is started by the insertion of an unfinished bearing race into the workpiece support mechanism, with the thrust bearing assembly and the honing stone being moved away from the workpiece support mechanism on their respective slides.

As soon as the load apparatus has loaded a new part into the machine, the clamping cylinder causes the thrust bearing assembly to be moved into its clamping position clamping the part against the continuously rotating spindle drive assembly to rotate the bearing race. The oscillation slide cylinder then moves the honing stone into alignment with the groove in the bearing race. The lift cylinder then retracts, lowering the honing stone into the groove in the bearing race. At this point, the oscillation assembly rocks the honing stone back and forth in abrading engagement with the bearing race. The stone feed cylinder causes a continuous downward pressure on the honing stone of a predetermined amount.

When the part is finished, the reverse operation is accomplished. The honing stone is lifted and the honing stone and thrust bearing assembly are retracted. The next work piece is then inserted into the work station of the machine, discharging the finish workpiece to the discharge shoot. Operation can then be repeated.

All of the foregoing operations are controlled by an electrically operated control mechanism 271, shown schematically in FIG. 1. The raising and lowering of the entire oscillation assembly for different sized parts by means of the worm gear jack is accomplished manually.

Figure 9:
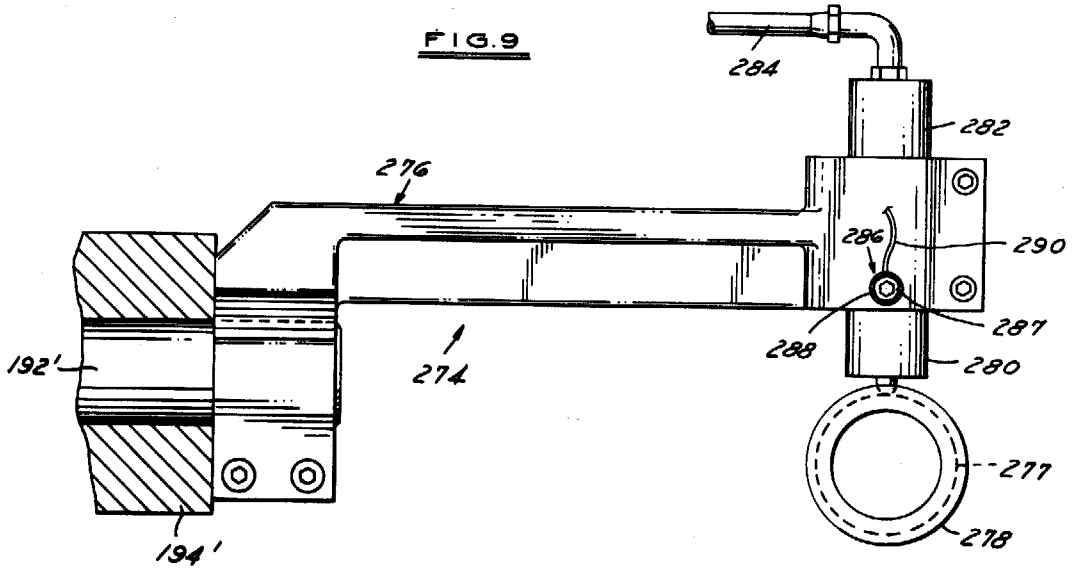
FIG. 9 is a partially schematic and partially broken front view showing a tool holder employed for purposes of honing an inner bearing race in the honing machine of the present invention.

The apparatus of the present invention is useful for finishing any type of workpiece with an arcuate groove formed about the circumference of a cylindrical portion of the workpiece. The inner race of a ball bearing assembly similarly can be finished with the apparatus of the prasent invention. The principle difference in the structure in the preferred apparatus for finishing an inner race is that a different type of oscillating tool holder is employed. This is shown in FIG. 9, with the thrust bearing assembly for holding the bearing race in the spindle assembly being broken away to show the tool holder more clearly.

The rest of the apparatus is the same as described above and will not be [dexcribed] *described* herein. Oscillating tool holder 274 employs a pivotable mounting shaft 192' substantially the same as shaft 192 in the above described embodiment. An oscillating arm 276 attached to the end of shaft 192' is, however, of somewhat different design from oscillating tool holder 198 used for outer bearing races. For honing the arcuate groove 277 formed around the outer periphery of an inner race 278 of a bearing, the honing stone does not fit inside of the bearing race, so it is not necessary to move the honing stone axially away from the bearing race to remove the bearing race in a sideways direction from the machine. Thus, the oscillation slide assembly is not employed in this application.

Oscillating bridge 276 comprises an L-shaped arm mounted at one end on shaft 192' and holding a honing stone mounting block 280 at the other end. A stone feed cylinder 282 is mounted directly above the honing stone for stone advancement purposes. A pneumatic hose 284 provides the necessary air pressure for the operation of the stone feed cylinder. A stone wear switch 286 interupts the honing operation when the honing stone is worn and must be replaced. Stone wear switch 286 comprises a metal screw 287 threaded into an insulating nylon bushing 288 in an opening in the mounting block and stone feed cylinder. When the piston of the stone feed cylinder approaches the end of its stroke, it makes electrical contact with the screw, therby causing an electrical signal to be transmitted through lead 290 to conventional shut off switch apparatus (not shown) for stopping the machine until the honing stone is changed.

The honing stone is inserted and removed from the groove of the bearing race by means of the same type of lift cylinder employed in the embodiment described above. This lift cylinder pivots mounting block 194' *attached to slide mechanism 158* upwardly in the same manner that lift cylinder 234 pivots mounting block 194 upwardly in the embodiment describe above.

With the honing stone pivoted to an upward position, a new work piece is inserted into the machine. Then, the lift cylinder is retracted to lower the honing stone downwardly into contact with the groove in the bearing race. Stone feed cylinder 282 maintains a constant downward pressure on the honing stone when the honing stone is in abrading engagement with the groove in the workpiece. Since the honing apparatus can be moved out of the way for removal of the inner bearing race simply by lifting the honing stone, axial displacement of the honing stone and oscillating bridge is not necessary.

It should be understood that the foregoing embodiment are merely exemplary of the preferred practice of the present invention and that various changes and modifications may be made in the arrangements and details of construction of the apparatus disclosed herein without departing from the spirit and scope of the present invention.

The embodiments of the invention in which an exclusive property or privilege is claimed are defined as follows:

1. A honing machine for honing an arcuate grooved surface that extends around the circumference of a cylindrical workpiece comprising:

workpiece support means for rotatably supporting the workpiece in a workpiece support position in the machine for rotation about the axis of the workpiece;

spindle drive means for rotating the workpiece while it is being held by the workpiece support means;

oscillation assembly means for holding a honing stone having an arcuate honing surface in abrading engagement with the arcuate surface of the workpiece as the workpiece is rotated, the oscillation assembly means causing the honing stone to be oscillated back and forth as it is held in abrading engagement with the arcuate surface of the rotating workpiece, said oscillation assembly means including:

oscillating tool holder means for holding the honing stone as it is oscillated, the tool holder means oscillating with the honing stone;

non-oscillating tool holder mounting means for supporting the oscillating tool holder means, said tool holder mounting means permitting oscillation of the tool holder means relative thereto, the tool holder mounting means being movable in the honing machine between an engaged position, wherein the honing stone fits into the arcuate grooved surface of the workpiece in abrading engagement therewith, and a disengaged position, wherein the honing stone is moved out of the arcuate grooved surface in the workpiece for insertion and removal of successive workpieces into and out of the honing machine, the tool holder mounting means being pivotably mounted on a base member for pivotal movement with respect to the base member *about an axis parallel to the workpiece axis* in a direction perpendicular to the axis of the work piece, said movement moving the tool holder mounting means between its engaged and disengaged positions, the tool holder mounting means including an [outer side] *upper plate that supports the oscillating tool holder means and a lower plate that carries the upper plate and an inner side* [on] *to* the base member [and an inner side] facing the workpiece support means, the [inner side] *lower plate* being positioned against the base member when the tool holder mounting means is in its engaged position, and the [inner side] *lower plate* being raised above the base member when the tool holder mounting means is in its disengaged position;

oscillation means for oscillating the tool holder means at least while the honing stone is in abrading engagement with the arcuate surface on the workpiece;

lift means for moving, upon actuation, the tool holder mounting means to its disengaged position to permit removal of the workpiece from the honing machine and insertion of a new workpiece into the machine, the lift means, upon deactuation, causing the tool holder mounting means to move back to its engaged position for honing the newly inserted workpiece, the lift means comprising lift cylinder means for raising the [inner side] *lower plate* of the tool holder mounting means with respect to the base member so as to move the tool holder mounting means between its engaged and disengaged positions for interchanging workpieces in the honing machine; and control means for controlling the operation of the honing machine, said control means actuating and deactuating the lift means for insertion and removal of successive workpieces into and out of the machine.

2. A honing machine according to claim 1 wherein the lift cylinder means includes a fluid operated lift cylinder having an extendible output shaft, with the lift cylinder being attached to the base member, said lift means further comprising toggle linkage means connecting the [inner side] *lower plate* of the tool holder mounting means and the base member, the toggle linkage means having a first position wherein the tool holder mounting means is in its engaged position, and a second position, wherein the tool holder mounting means is in its disengaged position, the toggle linkage means being attached to the extendible output shaft of the lift cylinder and being formed such that extension and retraction of the output shaft of the lift cylinder causes the toggle linkage means to raise and lower the tool holder mounting means between its engaged and disengaged positions.

3. A honing machine according to claim 2 wherein the toggle linkage means includes:

a short toggle pivotably attached to the base member at an upper end and pivotably attached to the output shaft of the lift cylinder at a lower end; and a long toggle pivotably attached to the [inner side] *lower plate* of the tool holder mounting means at an upper end and pivotably attached to the output shaft of the lift cylinder at a lower end, the long toggle being longer than the short toggle.

4. A honing machine according to claim 3 wherein the output shaft of the lift cylinder includes a yoke member having a center section and a pair of parallel legs, the output shaft being connected to the center section and a separate set of long and short toggles being connected to each leg of the yoke.

5. A honing machine according to claim 1 wherein the oscillation assembly means further includes axial oscillation slide means for moving *the upper plate of* the tool holder mounting means and oscillating tool holder means mounted thereon *with respect to the lower plate* in an axial direction relative to the axis of the workpiece so as to remove the honing stone from the plane of the workpiece for changing workpieces in the honing machine.

6. A honing machine according to claim 1 wherein the oscillation assembly means is mounted on a vertical slide and held in position at a predetermined position on the slide by an adjustable support mechanism extending between a fixed position base plate and the oscillation assembly means, the height of the support mechanism being adjustable to vary the engaged position of the tool holder means for accommodating different sized workpieces.

7. A honing machine according to claim 1 wherein:

the spindle drive means includes a rotating shaft, with the outer end of the shaft being formed for rotation producing engagement with the workpiece, the workpiece being rotated by being pressed against the outer end of the shaft and rotating co-axially therewith; and the workpiece support means includes releasable clamping means positioned on the side of the workpiece opposite the spindle drive means, said clamping means having a released position wherein the clamping means is spaced away from the workpiece, and a clamped position wherein the clamping means is pressed against the workpiece so as to press the workpiece against the spindle drive means for producing rotation therewith, the releasable clamping means comprising a radial thrust bearing including a thrust bearing housing mounted on a slide mechanism such that the thrust bearing housing can be slid axially toward and away from the workpiece, the thrust bearing further including a rotatable inner race mounted in the thrust bearing housing by means of bearings that permit relative rotation of the inner race with respect to the thrust bearing housing, the inner race having an *interally open* annular collar thereon that extends into contact with the workpiece around the entire outer periphery thereof when the clamping means is in its clamped position *and that provides access through the internal opening thereof for said oscillating tool holder means to effect internal honing of a cylindrical tubular workpiece* the collar on the inner race rotating with the workpiece as the workpiece is honed in the honing machine.

8. A honing machine for honing an arcuate grooved surface that extends around the circumference of a cylindrical workpiece comprising:

workpiece support means for rotatably supporting the workpiece in a workpiece support position in the machine for rotation about the axis of the workpiece;

spindle drive means for rotating the workpiece while it is being held by the workpiece support means;

oscillation assembly means for holding a honing stone having an arcuate honing surface in abrading engagement with the arcuate surface of the workpiece as the workpiece is rotated, the oscillation assembly means causing the honing stone to be oscillated back and forth as it is held in abrading engagement with the arcuate surface of the rotating workpiece, said oscillation assembly means including:

oscillating tool holder means for holding the honing stone as it is oscillated, the tool holder means oscillating with the honing stone;

non-oscillating tool holder mounting means for supporting the oscillating tool holder means, said tool holder mounting means permitting oscillation of the tool holder means relative thereto, the tool holder mounting means being movable in the honing machine between an engaged position, wherein the honing stone fits into the arcuate grooved surface of the workpiece in abrading engagement therewith, and a disengaged position, wherein the honing stone is moved out of the arcuate grooved surface in the workpiece for insertion and removal of successive workpieces into and out of the honing machine; the oscillating tool holder means comprising an elongated arm attached at an inner end to a pivot shaft rotatably mounted in the tool holder mounting means, the arm having an outer end that holds the honing stone, the honing stone being in the form of an elongated rod having its arcuate surface on one end thereof and being longitudinally movable in the tool holder means such that the honing stone can be continuously fed out of the tool holder means against the workpiece to compensate for wear on the stone, the oscillating tool holder means further including stone feed means for continuously exerting a predetermined downward pressure on the honing stone against the arcuate surface of the workpiece when the honing stone is in its abrading position against the workpiece, said stone feed means including torsion shaft means rotatably mounted on the tool holder means and extending from the inner to the outer end thereof, stone feed finger means extending from the side of the torsion shaft at the outer end thereof for pressing the honing stone downwardly as torsion is exerted on the shaft in a predetermined direction, stone feed cylinder means being mounted on the mounting arm at the inner end thereof and connected to the torsion arm for rotating the torsion shaft in said predetermined direction so as to exert a predetermined pressure on the honing stone;

oscillation means for oscillating the tool holder means at least while the honing stone is in abrading engagement with the arcuate surface on the workpiece;

lift means for moving, upon actuation, the tool holder mounting means to its disengaged position to permit removal of the workpiece from the honing machine and insertion of a new workpiece into the machine, the lift means, upon deactuation, causing the tool holder mounting means to move back to its engaged position for honing the newly inserted workpiece; and control means for controlling the operation of the honing machine, said control means actuating and deactuating the lift means for insertion and removal of successive workpiece into and out of the machine.

9. A honing machine according to claim 8 wherein the stone feed cylinder is mounted adjacent the axis of rotation of the tool holder in a direction transverse to the axis of the torsion shaft, the stone feed cylinder including an extendible output shaft attached to a link extending from the torsion shaft, longitudinal movement of the output shaft in a predetermined direction causing rotation of the torsion shaft in a predetermined direction to exert pressure on the honing stone.

10. A honing machine according to claim 9 wherein:

the elongated arm of the oscillating tool holder means includes a first arm extending radially out from the pivot shaft to an outer end, a second arm being attached to the outer end of the first arm and extending perpendicularly therefrom in an axial direction to an outer end thereof, a tool holding arm being attached to the outer end of the second arm and extending perpendicularly therefrom in a direction parallel to the first arm, the tool holder arm having an outer end that holds a honing stone mounting block, the honing stone mounting block having a longitudinal opening therethrough shaped to accommodate an elongated honing stone, resilient O-ring means extending into the longitudinal opening in the mounting block for resiliently holding the honing stone in the mounting block, longitudinal slot means being formed in at least a portion of the mounting block for permitting insertion of the stone feed finger into the opening in the mounting block for applying a continuous pressure to the stone as it is fed through the mounting block; and the torsion shaft of the stone feed means is rotatably mounted on the second arm, the stone feed finger extending from the outer end of the torsion shaft arm into engagement with the honing stone through the slot in the side of the mounting block, the stone feed cylinder being a fluid operated cylinder mounted on the first arm adjacent the point where the first arm is attached to the pivot shaft and extending outwardly in alignment with the first arm, the link interconnecting the output shaft of the stone feed cylinder and the torsion shaft being positioned at the outer end of the first arm.

11. A honing machine according to claim 10 wherein the honing stone is mounted for slight lateral movement in the opening in the mounting block such that the honing stone can float into proper alignment with the arcuate surface of the workpiece when the honing stone is pressed downwardly into abrading engagement with the workpiece.

12. A honing machine for honing an arcuate grooved surface that extends around the circumference of a cylindrical workpiece comprising:

workpiece support means for rotatably supporting the workpiece in a workpiece support position in the machine for rotation about the axis of the workpiece;

the workpiece support means including releasable clamp means for holding the workpiece in the support means while the workpiece is being honed, the clamp means being releasable to permit removal of the workpiece from the machine in a sideways direction when finished;

spindle drive means for rotating the workpiece while it is being held by the workpiece support means;

oscillation assembly means for holding a honing stone having an arcuate honing surface in abrading engagement with the arcuate surface of the workpiece as the workpiece is rotated, the oscillation assembly means causing the honing stone to be oscillated back and forth as it is held in abrading engagement with the arcuate surface of the rotating workpiece, said oscillation assembly means including lift means for moving the honing stone into and out of engagement with the workpiece, the lift means moving the honing stone away from the workpiece to a disengaged position after the workpiece has been honed such that the workpiece can then be removed from the machine in a sideways direction and a new workpiece inserted into the machine in a sideways direction;

automatic loading means for automatically loading successive workpiece into the machine and discharging finished workpieces from the machine, said loading means including:

loading ramp means positioned adjacent one side of the workpiece support means for conveying workpieces side by side downwardly to a loading position at a lower end thereof, said lower end being positioned adjacent the side of the workpiece support position, the lower end of the ramp means being open at the side thereof facing the workpiece support means;

a fluid operated load cylinder having an extendible output shaft mounted on the opposite side of the lower end of the loading ramp, said load cylinder being positioned such that the output shaft of the load cylinder is directed to engage and push the workpiece in the loading position into the workpiece support means upon extension of the output shaft of the load cylinder, movement of an unfinished workpiece from the loading ramp into the workpiece support station causing the dislodgement of the finished workpiece in the workpiece support station; and discharge ramp means mounted on the opposite side of the workpiece support means from the loading station for receiving and conveying discharged finished workpieces from the honing machine; and control means for controlling the operation of the honing machine, said control means actuating and deactuating the lift means for insertion and removal of successive workpieces into and out of the machine, the control means releasing the releasable clamp means and actuating the lift means to move the honing stone to its disengaged position when the workpiece is finished, such that insertion of a new workpiece into the workpiece support means can effect the dislodgement of the finished workpiece from the workpiece support means, the control means actuating the load cylinder to insert the new workpiece into the machine only after the disengagement of the tool holder mounting means and the release of the releasable clamp means.

* * * * *